US010308432B2

(12) United States Patent
Riva, II et al.

(10) Patent No.: US 10,308,432 B2
(45) Date of Patent: Jun. 4, 2019

(54) INSERT FOR WIRE MESH BELTS

(71) Applicant: WIRE-MESH PRODUCTS, INC., York, PA (US)

(72) Inventors: Richard D. Riva, II, Lancaster, PA (US); Dustin C. Carl, Mountville, PA (US)

(73) Assignee: WIRE-MESH PRODUCTS, INC., York, PA (US)

( * ) Notice: Subject to any disclaimer, the term of this patent is extended or adjusted under 35 U.S.C. 154(b) by 0 days.

(21) Appl. No.: 15/916,870

(22) Filed: Mar. 9, 2018

(65) Prior Publication Data
US 2018/0346251 A1 Dec. 6, 2018

Related U.S. Application Data

(60) Provisional application No. 62/512,995, filed on May 31, 2017.

(51) Int. Cl.
B65G 15/30 (2006.01)
B65G 15/54 (2006.01)
B65G 17/06 (2006.01)

(52) U.S. Cl.
CPC .......... B65G 17/064 (2013.01); B65G 15/54 (2013.01); B65G 2812/02188 (2013.01); B65G 2812/02217 (2013.01)

(58) Field of Classification Search
None
See application file for complete search history.

(56) References Cited

U.S. PATENT DOCUMENTS

| 3,526,207 | A |   | 9/1970  | Nadelson |            |
|-----------|---|---|---------|----------|------------|
| 3,920,117 | A |   | 11/1975 | Roinestad |           |
| 4,186,566 | A |   | 2/1980  | AuYoung  |            |
| 4,582,193 | A | * | 4/1986  | Larsson  | B65G 17/067 |
|           |   |   |         |          | 198/853    |
| 4,662,509 | A | * | 5/1987  | Kaak     | B65G 17/063 |
|           |   |   |         |          | 198/792    |
| 4,698,504 | A |   | 10/1987 | Van Pelt |            |
| 5,558,208 | A | * | 9/1996  | Kucharski | B65G 17/064 |
|           |   |   |         |          | 198/778    |
| 5,782,679 | A |   | 7/1998  | Hunter   |            |

(Continued)

OTHER PUBLICATIONS

Kentech, "Wire Mesh Belts Advantages and Applications," 1 pg, accessed Feb. 1, 2018; https://www.kentech.co.za/advantages_wire_mesh_belts.htm.

(Continued)

Primary Examiner — Kavel Singh
(74) Attorney, Agent, or Firm — McNees Wallace & Nurick LLC

(57) ABSTRACT

A wire mesh belt for use as a conveyor. The wire mesh belt has a plurality of links which are interlocked to form the wire mesh belt. First straight portions, second straight portions and bent portions of the links form passages which extend across the length of each link. A longitudinal axis of each link extends generally transversely to a longitudinal axis of the wire mesh belt. Support inserts are provided in the passages of respective links. The cooperation of the support inserts with the links provides support to the wire mesh belt to minimize the deformation of the wire mesh belt.

20 Claims, 4 Drawing Sheets

(56) References Cited

U.S. PATENT DOCUMENTS

| | | | |
|---|---|---|---|
| 6,041,916 A * | 3/2000 | Daringer | B65G 15/54 |
| | | | 198/834 |
| 8,006,739 B2 | 8/2011 | Costello | |
| 8,816,253 B2 | 8/2014 | Parks et al. | |
| 2006/0124268 A1* | 6/2006 | Billings | D21F 1/0072 |
| | | | 162/348 |

OTHER PUBLICATIONS

Industrial Uses and Benefits of Flat Wire Belts—Wire Mesh Products—Medium, 4 pgs., Nov. 10, 2016; https://medium.com/@wiremeshprod/everyday-uses-benefits-flat-wire-belts-154234a262c8.

\* cited by examiner

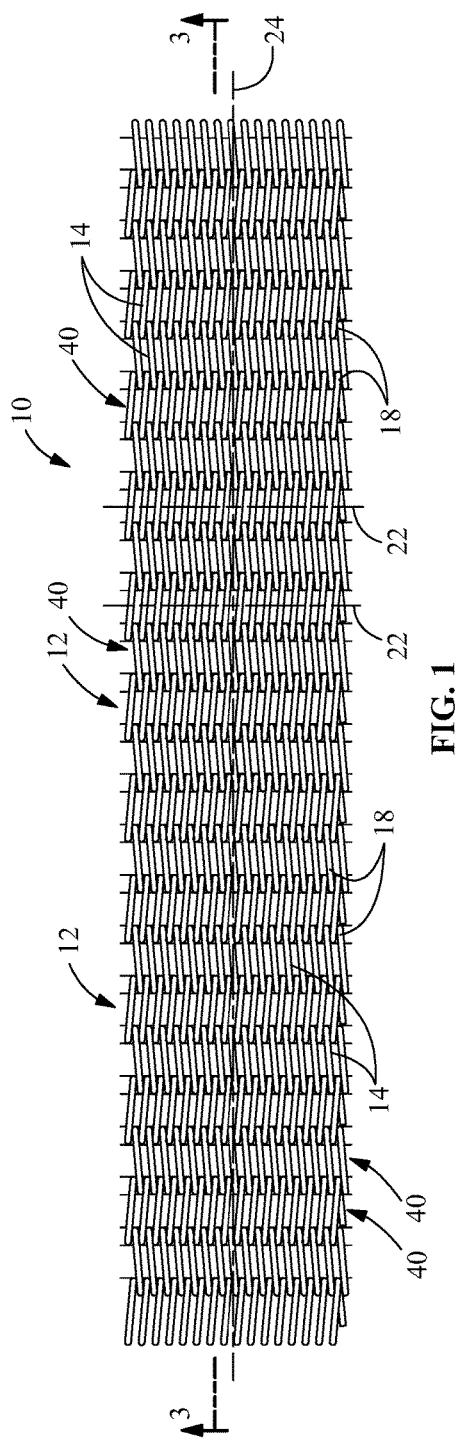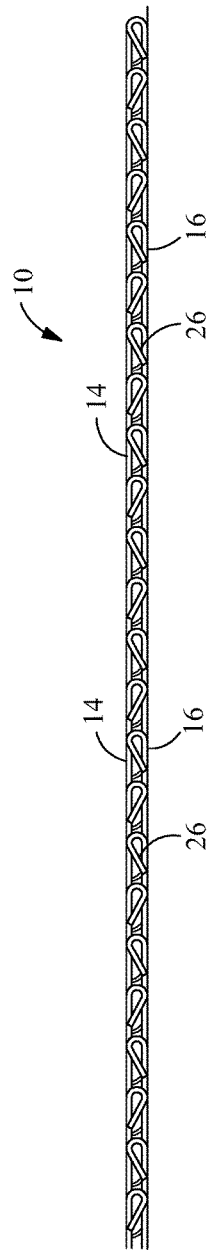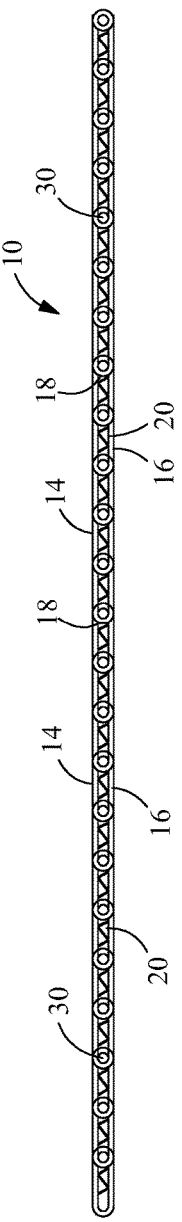

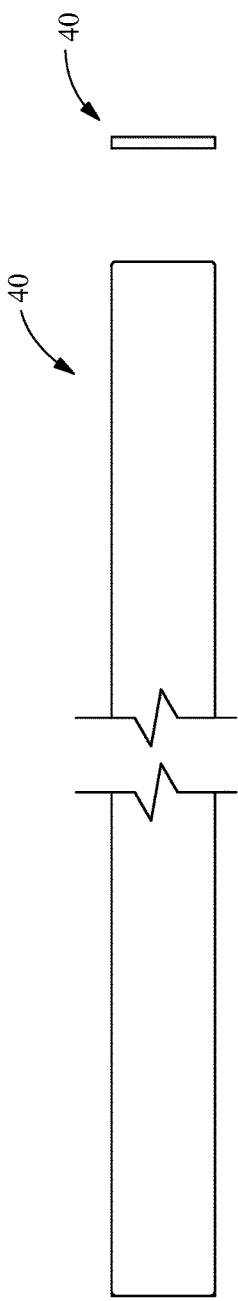
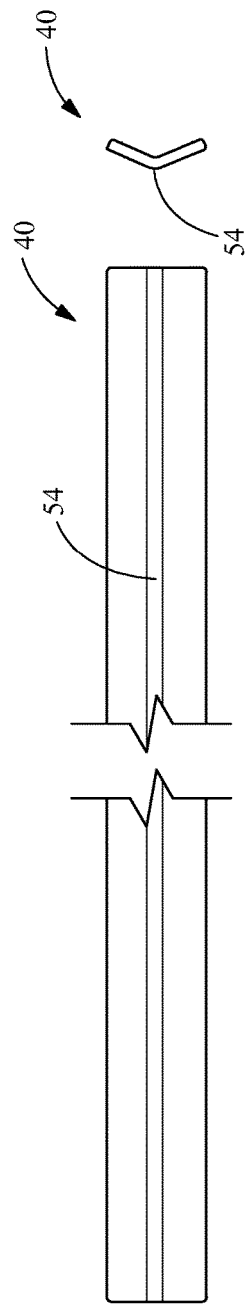
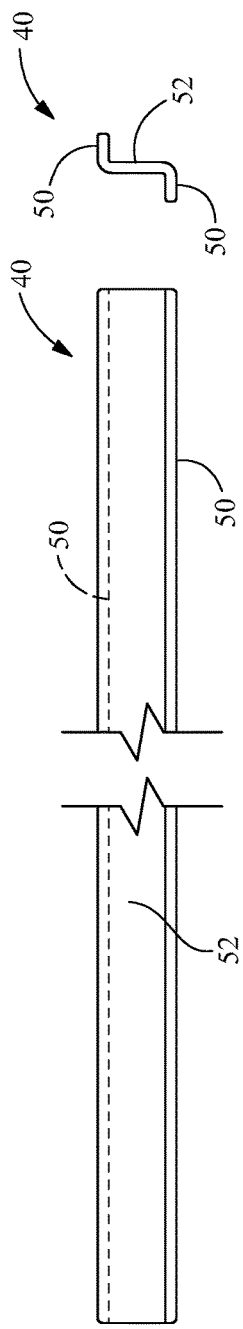

INSERT FOR WIRE MESH BELTS

FIELD OF THE INVENTION

The present invention relates to wire mesh belts. In particular, the invention relates to inserts for wire mesh belts which reduce or minimize deformation of the belts.

BACKGROUND OF THE INVENTION

Wire mesh conveyor belts comprised of a plurality of interlocked zig zag strands or links have been known in the prior art and have been in use for many years. Such belts have found wide use in many different manufacturing processes and apparatus. In a typical application, this type of wire mesh belt is joined together at its ends to form an endless conveyor belt. The belts are driven around one or more pulleys.

Wire mesh conveyor belts are configured to provide support to the articles which carried thereon. In addition, many wire mesh conveyor belts are configured to have openings which air or fluid to flow therethrough. In use, the wire mesh conveyor belts carry the loads and have force applied thereto by the pulleys and the like, which can result in undesired deformation and/or stretching along the length of the belt. This can also result in an excessive camber, deformation or bow across the width of the belt. This is particularly evident on wire mesh conveyor belts which are used in high temperature environments. These deformations can cause the wire mesh conveyor belts to become ineffective and in need of replacement.

Accordingly, what is needed is a cost-effective wire mesh belt that is sufficiently rigid and durable to resist stretching, camber or deformation to prevent the unwanted replacement of the belts.

SUMMARY OF THE INVENTION

An object is to provide a cost-effective wire mesh belt that is sufficiently rigid and durable to resist stretching, camber, arching, spiral collapse or other types of deformation, thereby increasing the life of the wire mesh belt.

An object is to provide a cost-effective wire mesh belt that has an insert which cooperates with the wire mesh to provide rigidity to the wire mesh to allow the wire mesh belt to resist stretching, camber, arching, spiral collapse or other types of deformation, thereby increasing the life of the wire mesh belt.

An object is to provide such a wire mesh belt which maintains a level and consistent carrying surface and which provide sufficient air and fluid flow therethrough.

An object is to provide such a wire mesh belt which maintains its flexibility, maintains its original width and facilitates belt splicing.

An embodiment is directed to a wire mesh belt for use as a conveyor. The wire mesh belt has a plurality of individual strands or links which are interlocked to form the wire mesh belt. The plurality of individual strands or links have a plurality of first straight portions and second straight portions. The first straight portions are connected to the second straight portions by bent portions. The first straight portions and the second straight portions are spaced apart. The first straight portions, the second straight portions and the bent portions form passages which extend across the length of each individual strand or link of the plurality of individual strands or links. A longitudinal axis of each individual strand or link of the plurality of individual strands or links extends generally transversely to a longitudinal axis of the wire mesh belt. Support inserts are provided in the passages of respective individual strands or links of the plurality of individual strands or links. The cooperation of the support inserts with the individual strands or links of the plurality of individual strands or links provides support to the wire mesh belt to minimize the deformation of the wire mesh belt.

An embodiment is directed to a wire mesh belt for use as a conveyor. The wire mesh belt has a plurality of strands or links, connector rods and support inserts. The plurality of links have a plurality of first straight portions and second straight portions. The first straight portions are connected to the second straight portions by bent portions. The first straight portions and the second straight portions are spaced apart. The first straight portions, the second straight portions and the bent portions form passages which extend across the length of each link of the plurality of links. The connector rods are positioned between the adjacent links of the plurality of links to join the adjacent links together. The support inserts are provided in passages of respective links of the plurality of links. The cooperation of the support inserts with the respective links of the plurality of links provides support to the wire mesh belt to minimize the deformation of the wire mesh belt.

Other objective, features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a top view of an illustrative wire mesh belt with illustrative inserts of the present invention inserted in every link of the wire mesh belt, the inserts cooperate with the wire mesh belt to prevent camber and stretching of the belt.

FIG. 2 is a side view of the illustrative wire mesh belt with illustrative inserts of the present invention inserted therein, as shown in FIG. 1.

FIG. 3 is a cross-sectional view of the illustrative wire mesh belt with illustrative inserts of the present invention inserted therein taken along line 3-3 of FIG. 1.

FIG. 4 is a perspective view of a first illustrative embodiment of the insert shown in FIG. 1.

FIG. 5 is an end view of the insert of FIG. 4.

FIG. 6 is a perspective view of a second illustrative embodiment of an insert according to the present invention.

FIG. 7 is an end view of the insert of FIG. 6.

FIG. 8 is a perspective view of a third illustrative embodiment of an insert according to the present invention.

FIG. 9 is an end view of the insert of FIG. 8.

DETAILED DESCRIPTION OF THE INVENTION

Figure 10:
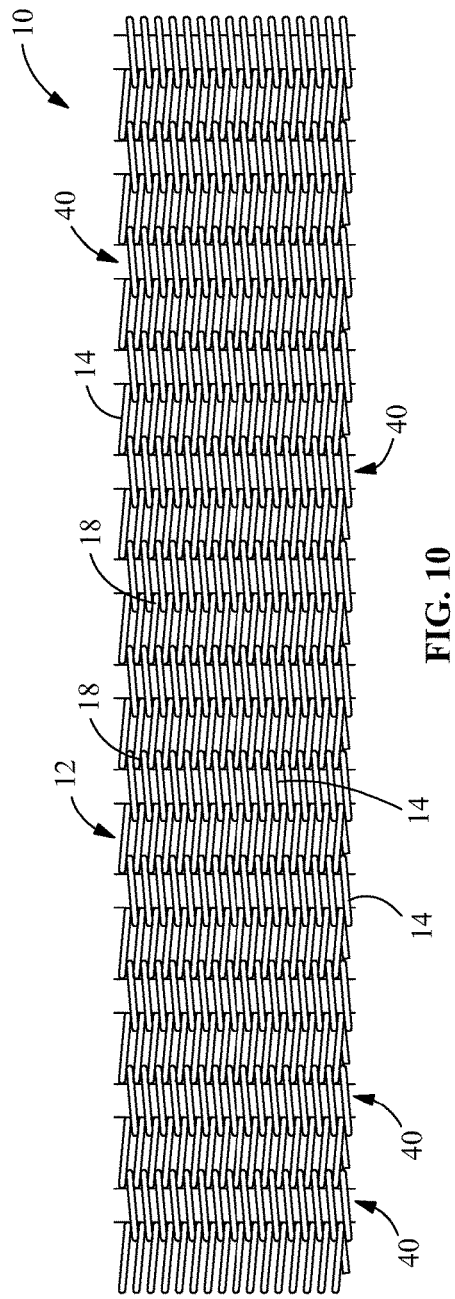
FIG. 10 is a top view of a second illustrative wire mesh belt with illustrative inserts of the present invention inserted in every second link of the wire mesh belt, the inserts cooperate with the wire mesh belt to prevent camber and stretching of the belt.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring to FIGS. 1-3 and 10-12, a wire mesh belt 10 is shown. The wire mesh belt 10 is a continuous belt which is used as a conveyor belt to support and transfer items or articles from one location to another. In the illustrative embodiment shown, the wire mesh belt 10 includes a plurality of individual zig zag strands or links 12 which are joined together in an interlocking or an interlinking manner to form the wire mesh belt 10.

Figure 12:
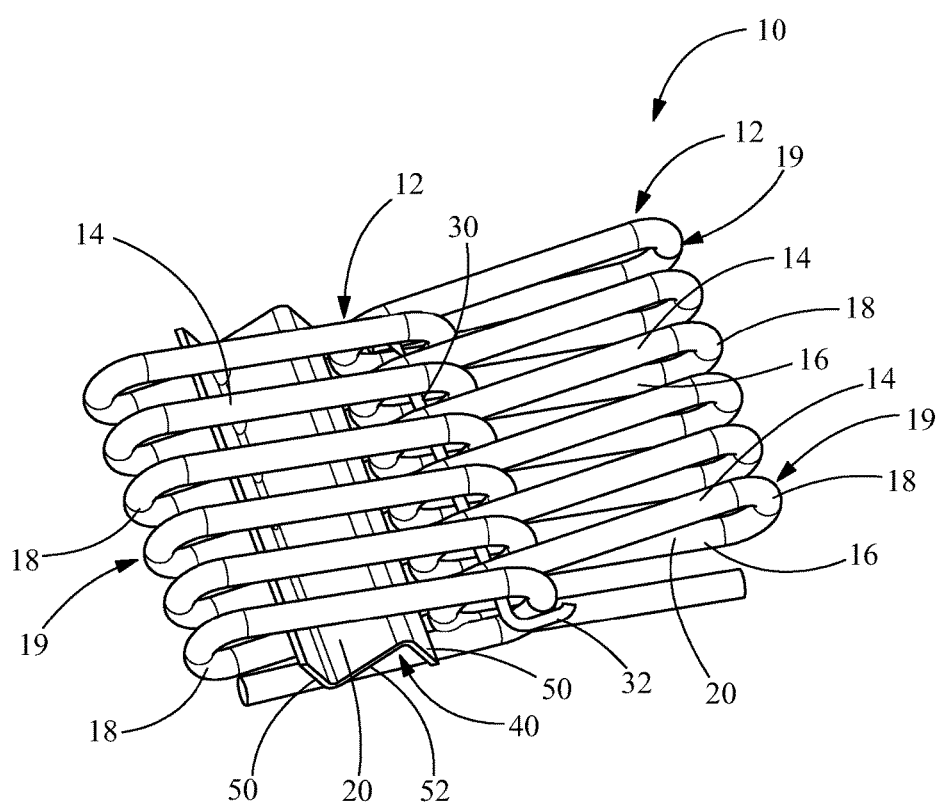
FIG. 12 is a perspective view of a section of the wire mesh belt of FIG. 10.

As best shown in FIG. 12, each individual zig zag strand or link 12 is comprised of a plurality of first straight portions 14, a plurality of second straight portions 16 and a plurality of bent portions 18 which extend between and connect the first straight portions 14 and the second straight portions 16. A respective first straight portion 14, a respective bent portion 18 attached to the first straight portion 14, a second straight portion 16 attached to the respective bent portion 18, and another respective bent portion 18 attached to the second straight portion 16 combine to form a loop 19 of the zig zag strand or link 12.

The first straight portions 14 and the second straight portions 16 are spaced apart. The first straight portions 14, the second straight portions 16 and the bent portions 18 form passages 20 which extend across the length of each individual zig zag strand or link 12 of the plurality of individual zig zag strands or links. As shown in FIG. 1, a longitudinal axis 22 of each zig zag strand or link 12 of the plurality of individual zig zag strands or links extends generally transversely to a longitudinal axis 24 of the wire mesh belt 10.

As best shown in FIG. 2, each zig zag strand or link 12 may have a hook or bent portion 26 provided on either end 28 thereof. The bent portions 26 facilitates the interlocking of adjacent strands 12 to provide stability at the edges of the belt 10.

As best shown in FIG. 12, separate lengths of the wire mesh conveyor belt 10 or the individual zig zag strands or links 12 are joined together by suitable connecting means or rods 30. The connecting rods 30 cooperate with overlapping bent portions 18 of adjacent zig zag strands or links 12, thereby allowing the adjacent zig zag strands or links 12 to move relative to each other while preventing the adjacent zig zag strands or links 12 from separating. The connecting rods 30 may have bent portions or ends 32 provided on the outer ends thereof to secure the connecting rods 30 to the respective zig zag strands or links 12.

To join two adjacent zig zag strands or links 12 of the wire mesh belt 10 together, such as, for example, when constructing the endless wire mesh conveyor belt, the two adjacent zig zag strands or links 12 are brought together. The bent portions 18 of the strands 12 in a first strand 12 are brought in axial alignment with the bent portions 18 of the strands 12 in a second strand 12. The connector rod 30 is then inserted from one edge of the belt 10 through all the bent portions 18 to join the two adjacent zig zag strands or links 12 together. After the connector rod 30 has been inserted through the bent portions 18, the outer ends of the connector rod 30 may be bent to form bent ends 32 which secure the connector rod 30 in place in the belt 10.

Figure 11:
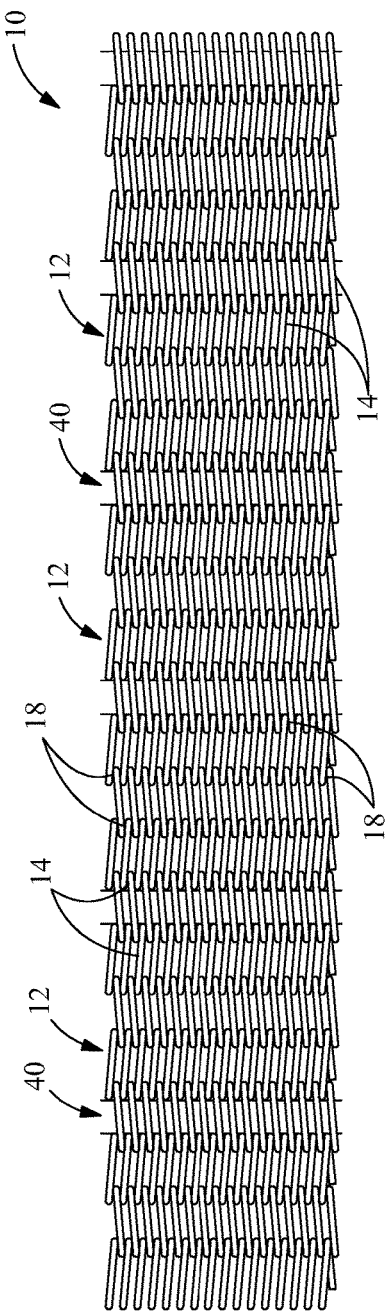
FIG. 11 is a top view of a third illustrative wire mesh belt with illustrative inserts of the present invention inserted in every fourth link of the wire mesh belt, the inserts cooperate with the wire mesh belt to prevent camber and stretching of the belt.

A support insert 40 is inserted into one or more passages 20 of the zig zag strands or links 12 of the wire mesh belt 12. In the embodiment shown in FIGS. 1-3, a support insert 40 is provided in the passage 20 of each of the zig zag strands or links 12. However, in other embodiments, the support inserts 40 may not be positioned in each row. For example, the support inserts 40 may be positioned: in the passage 20 of every second zig zag strand or link 12 (as shown in FIG. 10); or in the passage 20 of every fourth zig zag strand or link 12 (as shown in FIG. 11). Ends of the support insert 40 may be bent to form bent ends similar to bent ends 32 (FIG. 12) of connecting rod 30 (FIG. 12) which secure the support inserts 40 in place in the zig zag strands or links 12 of the belt 10.

While the embodiments shown illustrate multiple zig zag strands or links 12 interlinked to form the wire mesh belt 10, the wire mesh belt may be formed by using individual links or other methods known in the industry.

The zig zag strands or links 12 or links are formed from material having small diameters. In addition, the material used to create the zig zag strands or links 12 or links must be somewhat flexible to allow for the forming of the zig zag strands or links 12 or links. Therefore, when in use, the zig zag strands or links 12 or links may, over time, be deformed by, for example, stretching, cambering, arching, collapsing. The support inserts 40 cooperate with the zig zag strands or links 12 or links of the wire mesh belt 10 to provide additional support to prevent or minimize the amount of deformation of the zig zag strands or links 12 or links and the wire mesh belt 10.

In the illustrative embodiments shown, the loops 19 of the zig zag strands or links 12 of the wire mesh belt 10 are spaced apart such that a count of 12 to 60 links are provided across a 12-inch-wide section of the zig zag strands or links 12 of the belt 10. The zig zag strands or links 12 of the wire mesh belt 10 are spaced apart such that a count of 8 to 32 zig zag strands or links 12 are provided across a 12-inch-long section of the belt 10.

The loops 19 and the zig zag strands or links 12 may be made of any material having the desired strength and forming characteristics required, such as, but not limited to, steel, 304ss, 310ss, 314ss, 316ss, 35-19cb, Ni V cb (or 80-20cb), Inconel 601. The diameter of the material for the loops 19 and the zig zag strands or links 12 may vary. For example, the wire gauge of the loops 19 and the zig zag strands or links 12 may vary between 4 gauge and 24 gauge. In the illustrative embodiment shown, the wire gauge is 4 with a diameter of 0.135 inches.

The connecting rods 30 may be made of any material having the desired strength and forming characteristics required, such as, but not limited to, steel, 304ss, 310ss, 314ss, 316ss, 35-19cb, Ni V cb (or 80-20cb), Inconel 601. The diameter of the material for the connecting rods 30 may vary. In the illustrative embodiment shown, the diameter of the connecting rods 30 is 0.162 inches.

The length of the securing insert 40 can be varied based on the width of the zig zag strands or links 12 and the wire mesh belt 10. In illustrative embodiments, the securing inserts 40 have a length of between 2 inches and 288 inches. The width of the securing insert 40 may vary. In illustrative embodiments, the width of the securing inserts 40 is between 0.20 inches and 1.5 inches. The thickness of the securing insert 40 may vary. In illustrative embodiments, the thickness of the securing inserts 40 is between 0.020 inches and 0.25 inches. The securing insert 40 may be made of any material having the desired strength characteristics required, such as, but not limited to, steel, 304ss, 310ss, 314ss, 316ss, 35-19cb, Ni V cb (or 80-20cb), Inconel 601.

The securing insert 40 may have various configurations. In an illustrative embodiment, the securing inserts 40 shown in FIGS. 4 and 5 have an S-configuration in which end sections 50 are angled (for example perpendicular) relative to middle sections 52 of the support inserts 40. In a second illustrative embodiment, the securing inserts 40 shown in FIGS. 6 and 7 have a V-configuration in which raised center sections 54 extend the length of the support inserts 40. In a third illustrative embodiment, the securing inserts 40 shown in FIGS. 8 and 9 have a planar configuration.

The cooperation of the insert with the links resists stretching and camber of the wire mesh belt. The support of the insert also strengthens the spiral links, making them more resistant to collapse. This cooperation allows for an increased belt life, helps to maintain a level and consistent carrying surface, maintains the belt original width and maintains the belt flexibility over time.

While the invention has been described with reference to a preferred embodiment, it will be understood by those skilled in the art that various changes may be made, and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A wire mesh belt for use as a conveyor, the wire mesh belt comprising:
   a plurality of individual links which are interlocked to form the wire mesh belt, the plurality of individual links having a plurality of first straight portions and second straight portions, the first straight portions connected to the second straight portions by bent portions, the first straight portions and the second straight portions are spaced apart, the first straight portions, the second straight portions and the bent portions form passages which extend across the length of each individual link of the plurality of individual links, a longitudinal axis of each link of the plurality of individual links extends generally transversely to a longitudinal axis of the wire mesh belt;
   support inserts provided in and continuously remaining in the passages of respective individual links of the plurality of individual links, each support insert confined in a portion of a passage of each corresponding link of the respective individual links, the portion of the passage of each corresponding link of the respective individual links not including a corresponding passage of each link of other links interlocked with the respective individual links;
   wherein the cooperation of the support inserts with the individual links of the plurality of individual links provides support to the wire mesh belt to minimize the deformation of the wire mesh belt, and maintains a level and consistent carrying surface.

2. The wire mesh belt as recited in claim 1, wherein the support inserts have a planar configuration.

3. The wire mesh belt as recited in claim 1, wherein the support inserts have raised center sections which extend the length of the support inserts.

4. The wire mesh belt as recited in claim 1, wherein the support inserts have an S-configuration, end sections of the support inserts are at an angle relative to middle sections of the support inserts.

5. The wire mesh belt as recited in claim 1, wherein outer ends of the support inserts are bent to secure the support inserts in the passages of the plurality of individual links.

6. The wire mesh belt as recited in claim 1, wherein each support insert of the plurality of support inserts has a width between 0.20 inches and 1.5 inches.

7. The wire mesh belt as recited in claim 1, wherein each support insert of the plurality of support inserts has a thickness between 0.020 inches and 0.25 inches.

8. A wire mesh belt for use as a conveyor, the wire mesh belt comprising:
   a plurality of links, the plurality of links having of a plurality of first straight portions and second straight portions, the first straight portions connected to the second straight portions by bent portions, the first straight portions and the second straight portions are spaced apart, the first straight portions, the second straight portions and the bent portions form passages which extend across the length of each link of the plurality of links;
   connector rods positioned between adjacent links of the plurality of links to join the adjacent links together;
   support inserts provided in and continuously remaining in the passages of respective links of the plurality of links, each support insert confined in a portion of a passage of each corresponding link of the respective plurality of links, the portion of the passage of each corresponding link of the respective plurality of links not including a corresponding passage of each link of other links interlocked with the respective plurality of links;
   wherein the cooperation of the support inserts with the respective links of the plurality of links provides support to the wire mesh belt to minimize the deformation of the wire mesh belt, and maintains a level and consistent carrying surface.

9. The wire mesh belt as recited in claim 8, wherein the support inserts are provided in every fourth link of the plurality of links.

10. The wire mesh belt as recited in claim 8, wherein the support inserts are provided in every second link of the plurality of links.

11. The wire mesh belt as recited in claim 8, wherein the support inserts are provided in every link of the plurality of links.

12. The wire mesh belt as recited in claim 8, wherein the plurality of links have hooks on ends thereof which interlock with the ends of adjacent links of the plurality of links to provide stability at edges of the wire mesh belt.

13. The wire mesh belt as recited in claim 8, wherein outer ends of the connector rods are bent to secure the connector rods in the plurality of links.

14. The wire mesh belt as recited in claim 8, wherein the support inserts have a planar configuration.

15. The wire mesh belt as recited in claim 8, wherein the support inserts have raised center sections which extend the length of the support inserts.

16. The wire mesh belt as recited in claim 8, wherein the support inserts have an S-configuration.

17. The wire mesh belt as recited in claim 16, wherein the support inserts have end sections which are perpendicular to middle sections of the support inserts.

18. The wire mesh belt as recited in claim 8, wherein outer ends of the support inserts are bent to secure the support inserts in the passages of the plurality of links.

19. The wire mesh belt as recited in claim 8, wherein each support insert of the plurality of support inserts has a width between 0.20 inches and 1.5 inches.

20. The wire mesh belt as recited in claim 8, wherein each support insert of the plurality of support inserts has a thickness between 0.020 inches and 0.25 inches.

\* \* \* \* \*